Jan. 20, 1970   C. S. OTTESON ET AL   3,490,509
CAPTIVE NUT ASSEMBLY

Filed Nov. 14, 1967   2 Sheets-Sheet 1

INVENTORS
CHRISTIAN S. OTTESON
JAMES P. ETTINGER
BY
James and Franklin
ATTORNEY

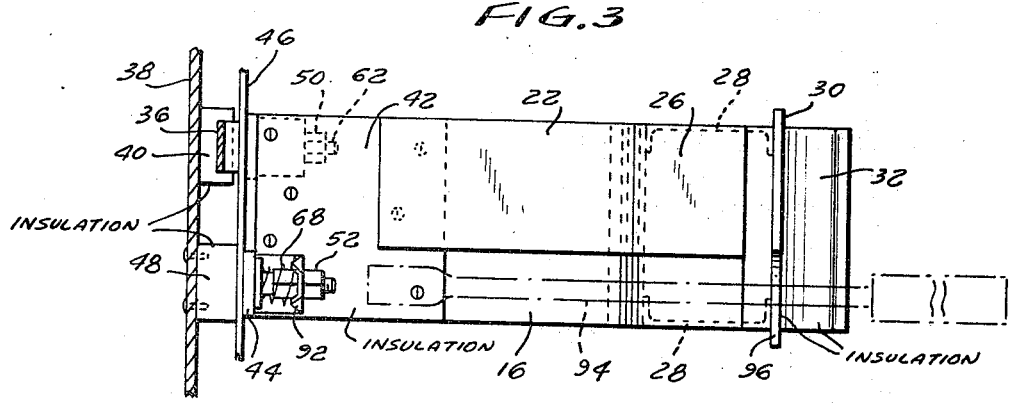
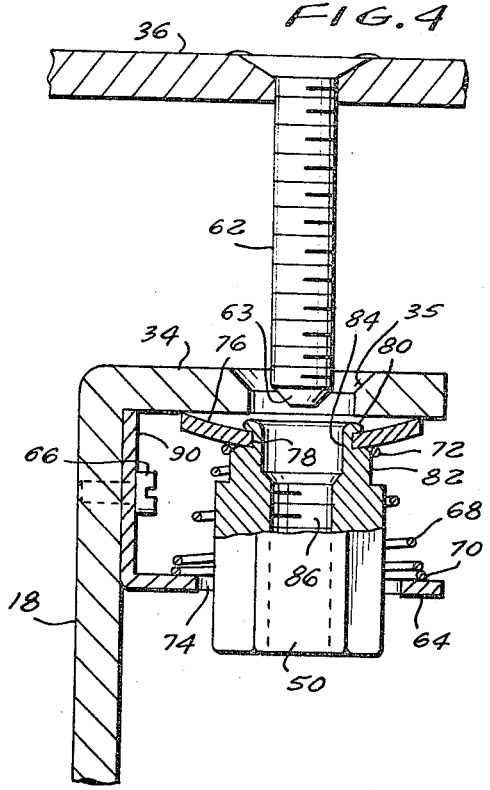
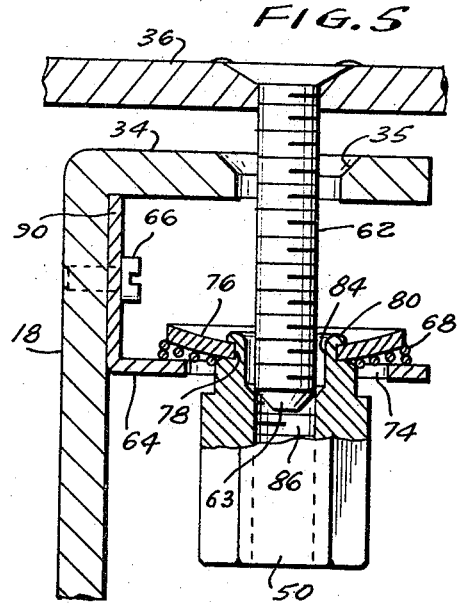
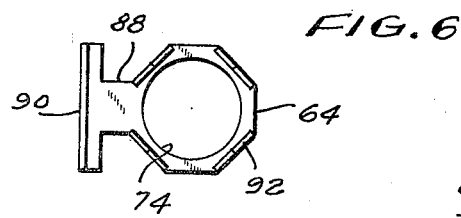

United States Patent Office 3,490,509
Patented Jan. 20, 1970

3,490,509
CAPTIVE NUT ASSEMBLY
Christian S. Otteson and James P. Ettinger, Ridgefield, Conn., assignors to Electric Regulator Corporation, Norwalk, Conn., a corporation of New York
Filed Nov. 14, 1967, Ser. No. 683,390
Int. Cl. F16b 43/00, 43/02
U.S. Cl. 151—69       10 Claims

ABSTRACT OF THE DISCLOSURE

The captive nut assembly is designed to be mounted on a detachable member which is to be secured by one or more nuts to a fixed member having mating screws projecting therefrom. It comprises a nut support bracket which is fixedly secured to the detachable member, and carries a nut having an axially elongated body which is both rotatable and axially movable relative to the bracket. There is a readily yieldable coiled spring one end of which is secured to the bracket, and the other end of which carries the nut, this spring urging the nut toward the screw. The bracket has a hole large enough for rotation of the nut, but the inner end of the nut inward of the bracket has a flange which is larger in diameter than the hole, so that it prevents escape of the nut in outward direction when the nut is pushed against the screw. The flange may be a washer-like disc fixedly secured to the nut.

BACKGROUND OF THE INVENTION

There are many structures in which it would be convenient and time saving to provide captive nuts to facilitate and expedite mounting a detachable member on a fixed member having screws projecting therefrom to receive the nuts. One particular example is a semiconductor rectifier module having heat dissipating fins and constituting one of a group of such modules which are to be mounted on bus bars at the back of an openable panel box. The nuts secure the modules both physically and electrically to the bus bars, and are at the rear or inner end of a module which is relatively long in front to back dimension. The modules are disposed one next to the other, thus making it difficult to handle ordinary loose nuts when removing and replacing a single module. The nut should be not merely captive, but also should readily find the screw and be self-aligning with it.

SUMMARY OF THE INVENTION

The captive nut assembly is designed to be mounted on a member which is to be detachably secured by one or more nuts to a fixed member having mating screws projecting therefrom. The assembly comprises a nut support bracket which is fixedly secured on the detachable member and which carries a nut having an axially elongated body which is both rotatable and axially movable relative to the bracket. There is a readily yieldable coiled spring one end of which is secured to the bracket, and the other end of which carries the nut, this spring urging the nut toward the screw. The bracket has a hole large enough for rotation of the nut, but the inner end of the nut inward of the bracket has a flange which is larger in diameter than the hole, so that it prevents escape of the nut in outward direction when the nut is pushed against the screw. More specifically, the exterior of the nut body at its inner end is cylindrical, and is stepped in diameter, the smaller step receiving a washer-like disc which is fixedly secured to the nut and which acts as the flange which prevents escape of the nut. The larger cylindrical step just inside the flange receives the inner end of the coiled spring. The inner end of the nut preferably has an oversized hole which tapers down to the threaded interior of the nut, in order to readily find and receive the end of the screw, and to self-center the nut on the screw.

The foregoing and additional features are described in the following detailed specification, which is accompanied by drawings in which:

FIG. 3 is a side elevation looking toward the left side of FIG. 2, and showing how the nut is reached by means of a long socket wrench shown in broken lines;

FIG. 4 is a fragmentary section drawn to enlarged scale and taken approximately on the line 4—4 of FIG. 1, but showing the relation of the parts as the module is moved into position;

FIG. 5 is a view similar to FIG. 4, but showing the relation of the parts as the nut is pushed outward by the screw, and before rotating the nut; and FIG. 6 is explanatory of a bracket forming a part of the nut assembly.

Figure 2:
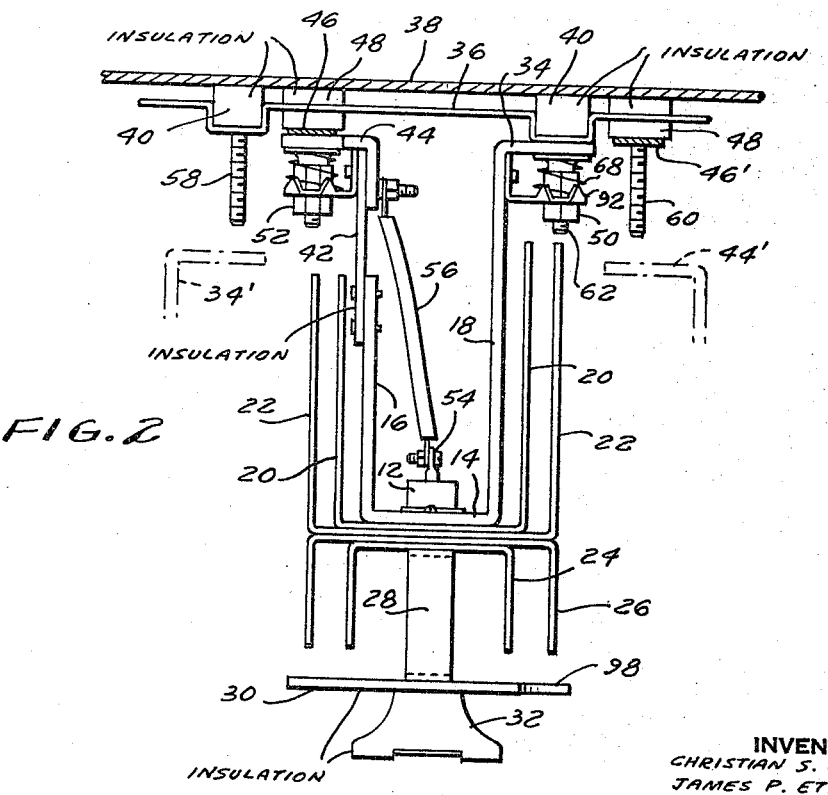
FIG. 2 is a plan view drawn to smaller scale.

Referring to the drawings, and more particularly to FIG. 2, the rectifier module comprises a silicon semi-conductor rectifier 12 mounted in a generally U shaped metal bar 14 having inwardly turned legs 16 and 18. There are additional inwardly directed U shaped members 20 and 22 and outwardly directed members 24 and 26 for increased heat dissipation. Top and bottom metal straps 28 carry a protective front plate 30 made of insulating material, and having an upright handle 32 also made of insulating material. Member 14 is structural and is made of heavier metal than the fins 20, 22, 24 and 26.

The inner end of leg 18 is turned outward to provide a foot 34 to be mounted against a horizontal metal bus bar 36. This bus bar is itself fixedly mounted on the back wall 38 of a control panel, and is insulated from wall 38 by insulating members 40.

The other leg 16 is cut short and extended by an insulating plate 42 which in turn carries a metal angle piece acting as a foot piece 44 which is mechanically and electrically connected to a vertical bus bar 46. This bus bar is fixedly mounted on the back 38 of the panel on insulating blocks 48. The bus bar 36 is displaced inward between insulators 40 to space the horizontal from the vertical bus bars.

The module is secured mechanically and electrically to the bus bars by means of two captive nuts 50 and 52. One terminal of the rectifier 12 is mounted on and directly connected to bar 14 and so through leg 18 and foot 34 to the horizontal bus bar 36. The other terminal 54 of the rectifier is connected by a short insulated lead 56 to the angle piece and foot 44 and so to the other bus bar 46. It will be understood that in the usual installation there are immediately neighboring modules, as suggested by the broken line foot 34' to be received on a screw 58 fixedly projecting from the horizontal bus bar 36, and the broken line foot 44' to be received on a screw 60 fixedly projecting from a vertical bus bar 46'.

Referring now to FIG. 4, the foot 34 of module leg 18 is shown being moved on to fixed screw 62. The captive nut assembly comprises a nut support bracket 64 which is secured to leg 18, in this case by two screws as shown at 66. The nut 50 has an axially elongated body and is rotatably and axially movable relative to the bracket 64. For this purpose there is a coiled spring 68, the outer end 70 of which is secured to bracket 64, and the inner end 72 of which carries the nut 50. The spring urges the nut inward so that at this time it bears against the foot 34. The spring preferably tapers from a large diameter end 70 to a small diameter end 72.

Bracket 64 has a hole 74 large enough for free rotation of the nut 50, but the inner end of the nut has a flange 76 which is larger in diameter than the hole 74 so that it prevents escape of the nut in outward direction, when pushed outwardly by the screw as the module is pushed inward. This is shown by the change from FIG. 4 to FIG. 5 of the drawing, the latter showing the nut 50 held outward by the screw 62, before rotation or tightening of the nut, as the module is pushed inward toward the bus bar 36.

The flange 76 is preferably a washer-like member added to the nut body. The inner end of the nut is cylindrical and is stepped in diameter. The smaller cylindrical step 78 (FIG. 4) receives the washer 76, and is spun outward as shown at 80 to fix or rivet the washer in position against a shoulder formed by the larger diameter cylindrical part 82. The inner end 72 of spring 68 is coiled about the part 82, the latter being rotatable within the spring.

The inner end of the nut has an oversized hole 84 which tapers down to the threaded interior 86 of the nut in order to readily find and receive the end of the screw, and to self-center the nut on the screw. This again is shown by the change from FIG. 4 to FIG. 5 of the drawing.

Figure 1:
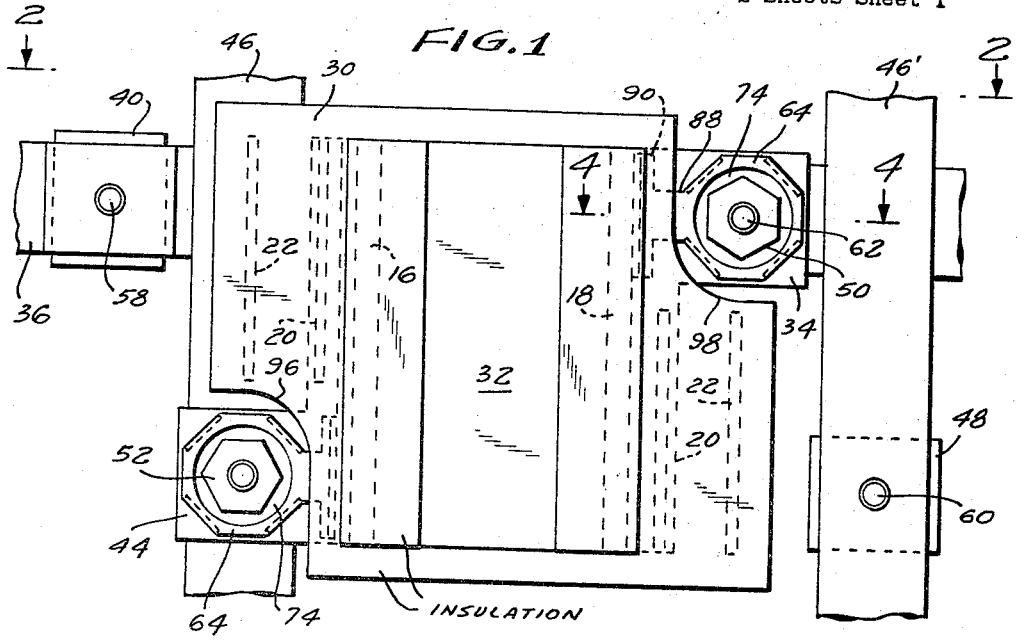
FIG. 1 is a front elevation of a rectifier module having two captive nuts embodying features of the present invention.

Referring now to FIGS. 1 and 6 the bracket 64 is initially square, and is connected by a neck 88 to the base portion 90 of the bracket. The four exposed corners of the square part 64 are bent inward as shown at 92 in FIGS. 2, 3 and 6, thus providing four corner tabs in which the large diameter end 70 of the coiled spring 68 is snugly anchored.

Referring to FIG. 3, the fins 22 and 26 are narrower than the main leg 16, thus providing clearance for passage of a long socket wrench, shown in broken lines at 94. The lower left corner of the front insulation plate 30 is cut away as shown at 96 to clear the wrench 94. This cut-away at 96 is most clearly shown in FIG. 1, which also shows how the fins 20 and 22 are narrowed upward at the left side, and downward at the right side, relative to the structural mounting 14 and its legs 16 and 18.

In generally similar fashion the upper right corner of the front plate 30 is cut away as shown in FIG. 1 at 98, and the fins 20 and 22 are narrower than the leg 18 in order to provide clearance above the fins for a wrench reaching the nut at the upper right corner of the module. It will be evident that with this arrangement the modules may be close to one another, and yet there is no difficulty in removing and replacing a module without disturbing the adjacent modules. When the module is inserted the two corner nuts approach their respective screws as shown in FIG. 4, and the nuts are held outward by the screws as the module is advanced as shown in FIG. 5. Thereupon the wrench is used to tighten the nuts, which finally assume the position shown in FIG. 2, in which the inner ends of the nuts clamp the feet 34 and 44 tightly against their respective bus bars 36 and 46.

To further facilitate mounting of the assembly on the screws receiving the same, the hole in bracket 34 (FIGS. 4 and 5) is preferably countersunk or bevelled on the side approaching the screw, as shown at 35. Moreover, the forward end of the screw 62 is preferably chamfered or bevelled as shown at 63. When removing the assembly the nut is turned by means of a wrench until a ratchet-like or clicking sound is heard, which indicates that the nut has been disengaged from the last thread on the screw.

It is believed that the construction and method of use of our improved captive nut assembly, as well as the advantages thereof, will be apparent from the foregoing detailed description. It will be understood that the mounting of a rectifier module on bus bars has been described merely as an example of how the captive nut assembly may be used.

We claim:

1. A captive nut assembly to be mounted on a detachable member which is to be secured by a nut to a fixed member having a screw projecting therefrom, said captive nut assembly comprising a nut, a nut support bracket adapted to be fixedly secured to the detachable member, said nut having an axially elongated body rotatably and axially movable relative to said bracket, and means to prevent escape of the nut from the bracket, in which there is a readily yieldable coiled spring one end of which is secured to the bracket, and the other end of which carries the nut, said spring urging said nut inward toward the apertured part of the detachable member, in which the inner end of the nut has an oversized hole which tapers down to the threaded interior of the nut, in order to readily find and receive the end of the screw and to self-center the nut on the screw, in which the exterior of the inner end part of the nut is cylindrical and is stepped in diameter, the smaller cylindrical step receiving a washer-like disc which acts as the aforesaid flange, and the larger cylindrical step receiving the inner end of the aforesaid spring, said larger cylindrical step being rotatable in said spring, and in which the bracket has a base adapted to be secured to the detachable member, and has a generally square part having the aforesaid large hole therein, and has a connecting part between the said base and the said square part, the four corners of the generally square part being bent inward to receive and hold the outer end of the spring.

2. The combination with the detachable nut assembly of claim 1, of a fixed member having a screw projecting therefrom to receive the nut, said detachable member and said nut support bracket being secured in proper position to locate the nut in alignment with the screw when the detachable member is in desired relation to the fixed member.

3. A captive nut assembly to be mounted on a detachable member which is to be secured by a nut to a fixed member having a screw projecting therefrom, said captive nut assembly comprising a nut, a nut support bracket adapted to be fixedly secured to the detachable member, said nut having an axially elongated body rotatably and axially movable relative to said bracket, and means to prevent escape of the nut from the bracket, in which there is a readily yieldable coiled spring one end of which is secured to the bracket, and the other end of which carries the nut, said spring urging said nut inward toward the apertured part of the detachable member, and in which the bracket has a base adapted to be secured to the detachable member, and has a generally square part with a large hole larger in diameter than the body of the nut, and has a connecting part between the said base and the said square part, the four corners of the generally square part being bent inward to receive and hold the outer end of the spring.

4. A captive nut assembly mounted on a detachable member which is to be secured by a nut to a fixed member having a screw projecting therefrom, said detachable member having an aperture large enough to receive the screw but too small to pass the nut, said captive nut assembly comprising a nut having an axially elongated body at least the outer end of which has flats to receive a wrench, the inner end of said nut having a flange larger in diameter than any other part of the nut, a nut support bracket fixedly secured on the detachable member and having a part transverse to the axis of the nut and spaced from the apertured part of the detachable member an amount less than the axial length of the nut, said transverse part having a hole large enough for free passage and free rotation of the flatted portion of the nut, the flange at the inner end of the nut being located between said transverse part and said apertured part of the detachable member and having a diameter larger than the hole in the bracket to prevent escape of the nut, whereby said nut may be assembled with said bracket by passing the outer end foremost through the large hole in the bracket, the elongated body of the nut having a length such that when the inner end of the nut reaches the detachable member the outer flatted end of the nut still projects beyond the transverse part of the bracket so that it is accessible to receive a wrench or equivalent tool.

5. A captive nut assembly as defined in claim 12 in which the bracket has two relatively perpendicular walls, one wall being the aforesaid transverse part receiving the nut, and the other wall being of such length in the direction of the axis of the nut that it acts as a spacer to properly space the transverse part of the bracket from the apertured part of the detachable member.

6. A captive nut assembly as defined in claim 4, in which the exterior of the inner end part of the nut is cylindrical and is stepped in diameter, the small cylindrical step receiving a washer-like disc which is fixedly secured thereto and acts as the aforesaid flange.

7. A captive nut assembly as defined in claim 4, in which the bracket has a base adapted to be secured to the detachable member, and has a generally square part with a said large hole larger in diameter than the body of the nut, and has a connecting part between the said base and the said square part, the four corners of the generally square part being bent inward to receive and hold the outer end of the spring.

8. A captive nut assembly as defined in claim 4, in which there is a readily yieldable coiled spring one end of which is secured to the bracket, and the other end of which carries the nut, said spring urging said nut inward toward the apertured part of the detachable member, in which the exterior of the inner end part of the nut is cylindrical and is stepped in diameter, the smaller cylindrical step receiving a washer-like disc which acts as the aforesaid flange, and the larger cylindrical step receiving the inner end of the aforesaid spring, said larger cylindrical step being rotatable in said spring.

9. A captive nut assembly as defined in claim 8, in which the bracket has a base adapted to be secured to the detachable member, and has a generally square part having the aforesaid large hole therein, and has a connecting part between the said base and the said generally square part, the four corners of the square part being bent inward to receive and hold the outer end of the spring.

10. The combination with the detachable nut assembly of claim 9, of a fixed member having a screw projecting therefrom to receive the nut, said detachable member to said nut support bracket being secured in proper position to locate the nut in alignment with the screw when the detachable member is in desired relation to the fixed member.

References Cited

UNITED STATES PATENTS

| 1,463,147 | 7/1923 | Hillmer | 151—38 |
| 1,843,985 | 2/1932 | Nelson | 151—41.71 |
| 2,649,126 | 8/1953 | Tinnerman | 151—41.76 |
| 2,659,125 | 11/1953 | Williams | 151—38 |
| 3,093,222 | 6/1963 | Christoffersen et al. | 151—69 |
| 3,149,828 | 9/1964 | Schutmart | 151—69 |
| 3,263,728 | 8/1966 | Lynch | 151—69 |
| 3,289,726 | 12/1966 | Sauter | 151—69 |

FOREIGN PATENTS

| 235,632 | 1/1964 | Austria. |
| 790,781 | 2/1958 | Great Britain. |
| 828,194 | 2/1960 | Great Britain. |
| 250,042 | 5/1948 | Switzerland. |

MARION PARSONS, Jr., Primary Examiner